United States Patent
Stine

(10) Patent No.: US 9,126,174 B2
(45) Date of Patent: Sep. 8, 2015

(54) HYDROPROCESSING METHOD, OR AN APPARATUS RELATING THERETO

(75) Inventor: Laurence O. Stine, Western Springs, IL (US)

(73) Assignee: UOP LLC, Des Plaines, IL (US)

( * ) Notice: Subject to any disclaimer, the term of this patent is extended or adjusted under 35 U.S.C. 154(b) by 555 days.

(21) Appl. No.: 13/073,857

(22) Filed: Mar. 28, 2011

(65) Prior Publication Data

US 2011/0240522 A1     Oct. 6, 2011

Related U.S. Application Data

(60) Provisional application No. 61/319,378, filed on Mar. 31, 2010.

(51) Int. Cl.

| | |
|---|---|
| *B01J 8/12* | (2006.01) |
| *B01J 8/18* | (2006.01) |
| *B01J 8/22* | (2006.01) |
| *B01J 8/38* | (2006.01) |
| *B01J 8/00* | (2006.01) |
| *B01J 8/34* | (2006.01) |
| *C10G 49/16* | (2006.01) |

(52) U.S. Cl.
CPC *B01J 8/226* (2013.01); *B01J 8/007* (2013.01); *B01J 8/0055* (2013.01); *B01J 8/12* (2013.01); *B01J 8/125* (2013.01); *B01J 8/1827* (2013.01); *B01J 8/1854* (2013.01); *B01J 8/34* (2013.01); *B01J 8/386* (2013.01); *C10G 49/16* (2013.01)

(58) Field of Classification Search
None
See application file for complete search history.

(56) References Cited

U.S. PATENT DOCUMENTS

| | | | | |
|---|---|---|---|---|
| 2,378,607 | A | * | 6/1945 | Watts ............................. 422/144 |
| 2,449,601 | A | * | 9/1948 | Gohr et al. ..................... 422/144 |
| 2,463,434 | A | * | 3/1949 | Shankland ..................... 208/151 |
| 2,514,288 | A | * | 7/1950 | Nicholson ..................... 208/147 |
| 2,785,110 | A | * | 3/1957 | Leffer ............................ 208/150 |
| 2,804,368 | A | * | 8/1957 | Summers, Jr. ................. 208/164 |
| 3,830,637 | A | | 8/1974 | Thompson |
| 3,876,530 | A | | 4/1975 | Frayer et al. |
| 3,905,893 | A | | 9/1975 | Christman et al. |
| 3,907,667 | A | | 9/1975 | Murphy, Jr. et al. |
| 3,936,370 | A | | 2/1976 | Henke et al. |
| 4,002,438 | A | * | 1/1977 | Fleming ............................ 48/76 |
| 4,017,380 | A | | 4/1977 | Byler et al. |
| 4,298,453 | A | | 11/1981 | Schoennagel et al. |
| 4,316,794 | A | | 2/1982 | Schoennagel |
| 4,348,272 | A | | 9/1982 | Tu |
| 4,377,066 | A | * | 3/1983 | Dickinson ........................ 60/775 |
| 4,427,539 | A | | 1/1984 | Busch et al. |
| 4,431,515 | A | | 2/1984 | Myers et al. |
| 4,525,267 | A | | 6/1985 | Inooka |
| 4,584,090 | A | | 4/1986 | Farnsworth |
| 4,708,785 | A | | 11/1987 | Myers |

(Continued)

OTHER PUBLICATIONS

Abstract of JP 59105085 A Published Jun. 18, 1984 by Mitsubishi Heavy Ind. Ltd.

(Continued)

*Primary Examiner* — Jennifer A Leung
(74) *Attorney, Agent, or Firm* — James C. Paschall

(57) ABSTRACT

One exemplary embodiment can be a hydroprocessing method. The hydroprocessing method can include providing a feed and a stream including hydrogen to a vessel. The vessel may have a catalyst collector and an internal riser. Generally, a catalyst circulates within the vessel by at least partially rising within the internal riser.

16 Claims, 1 Drawing Sheet

(56) References Cited

U.S. PATENT DOCUMENTS

| | | | |
|---|---|---|---|
| 4,786,400 A | | 11/1988 | Farnsworth |
| 4,859,315 A | | 8/1989 | Bartholic |
| 4,872,969 A | | 10/1989 | Sechrist |
| 6,045,688 A | * | 4/2000 | Ruottu et al. ............... 208/113 |
| 7,247,233 B1 | | 7/2007 | Hedrick et al. |
| 7,312,370 B2 | | 12/2007 | Pittman et al. |
| 2009/0145810 A1 | | 6/2009 | Etter |
| 2009/0152167 A1 | * | 6/2009 | Sandacz ....................... 208/113 |

OTHER PUBLICATIONS

Abstract of JP 5112785 A Published May 7, 1984 by Idemitsu Kosan Co.

Epperly et al., "Synfuels Processing: Donor Solvent Coal Liquefaction", Chemical Engineering Progress, May 1981, pp. 73-79.

Okuyama et al., "Hyper-Coal Process to Produce the Ash-Free Coal", Fuel Processing Technology, 2004, vol. 85, pp. 947-967.

* cited by examiner

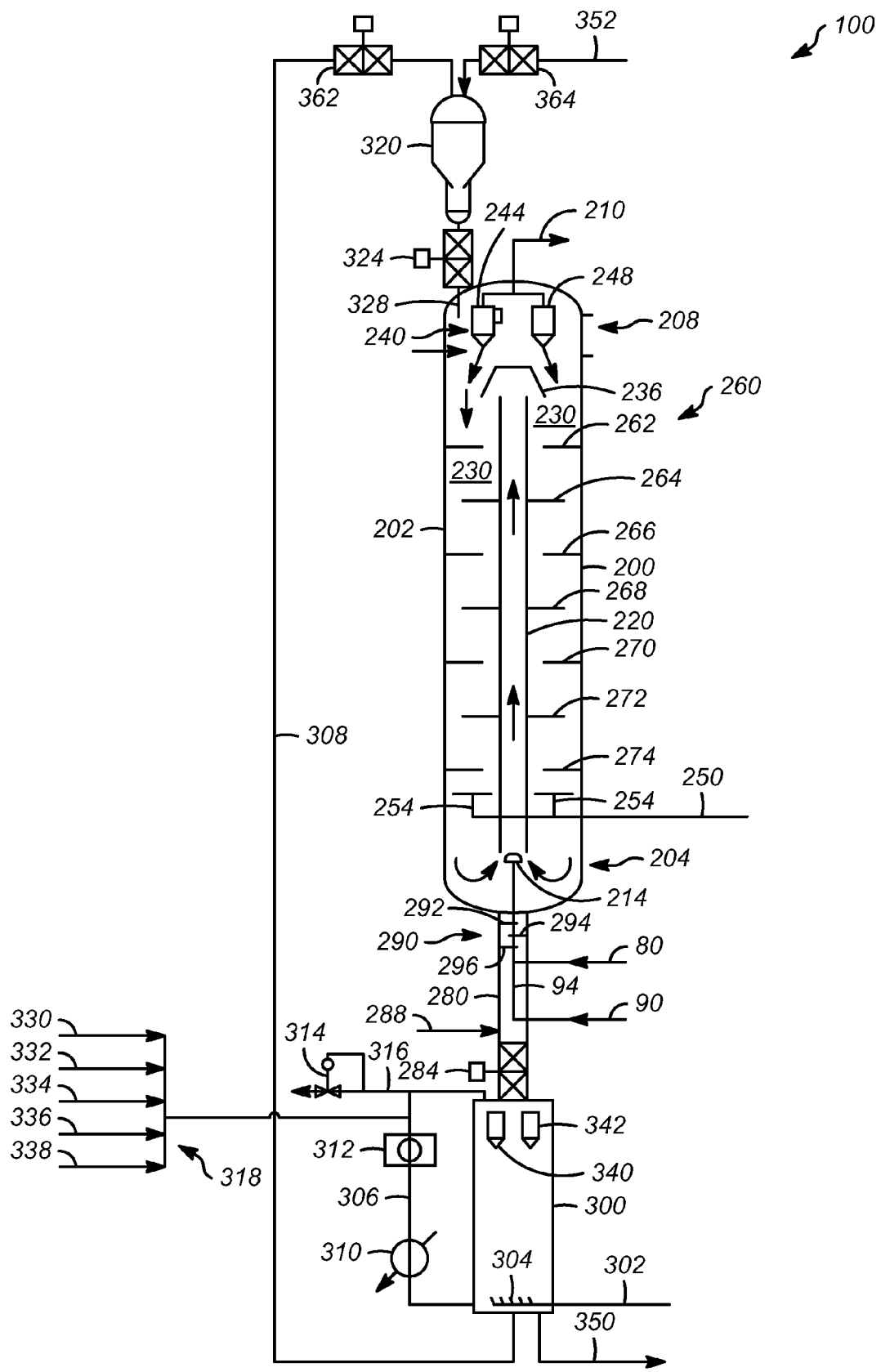

HYDROPROCESSING METHOD, OR AN APPARATUS RELATING THERETO

CROSS-REFERENCE TO RELATED APPLICATION

This application claims the benefit of U.S. Provisional Application No. 61/319,378 filed Mar. 31, 2010, which is hereby incorporated by reference in its entirety.

FIELD OF THE INVENTION

This invention generally relates to a hydroprocessing method, or an apparatus relating thereto.

DESCRIPTION OF THE RELATED ART

In typical hydroprocessing, a fixed bed may be utilized. Often, such beds include catalyst having an average diameter of about 1.6-about 3.2 millimeters. Usually, smaller diameter catalyst cannot be utilized due to pressure drop limitations across the catalyst bed. However, utilizing a catalyst having a larger size can create diffusion issues, which can impede conversion of a feed. Particularly, in such fixed beds, there is a trade-off between the pressure drop across the bed and the diffusion of the oil into the catalyst. Desirably, it would be advantageous to utilize a catalyst having a smaller dimension, but the use of a smaller catalyst size can require a different type of bed.

A fluid catalytic cracking (can be abbreviated "FCC" herein) process may utilize catalysts having a smaller dimension, including catalysts having a size less than about 100 microns. Generally, these processes operate at a lower pressure and in the absence of hydrogen. Particularly, often a fluid catalytic cracking unit has a regeneration zone utilizing oxygen. Hence, adding a high pressure hydrogen reactor in communication with an oxygen regenerator can create a safety hazard. Moreover, having an external riser with a reaction vessel can create maintenance issues with regard to maintaining expansion joints with high pressure equipment. As a consequence, utilizing a fluid catalytic cracking process at high pressure and in the presence of hydrogen is generally considered undesirable.

Thus, there is a desire to provide a more efficient hydroprocessing method and/or apparatus while minimizing the risk inherent thereto.

SUMMARY OF THE INVENTION

One exemplary embodiment can be a hydroprocessing method. The hydroprocessing method can include providing a feed and a stream including hydrogen to a vessel. The vessel may have a catalyst collector and an internal riser. Generally, a catalyst circulates within the vessel by at least partially rising within the internal riser.

Another exemplary embodiment may be an apparatus for receiving a feed for hydroprocessing. The apparatus can include a vessel, which in turn, may include an internal riser and one or more separation devices. The internal riser may be wholly contained within a shell of the vessel. Generally, the one or more separation devices may be positioned above the internal riser for separating a hydroprocessed product from a catalyst.

Yet another exemplary embodiment can include an apparatus for receiving a feed for hydroprocessing. The apparatus may include a vessel, an internal riser, one or more separation devices, a catalyst collector, and a regenerator. The internal riser may be wholly positioned within the vessel. Generally, one or more separation devices is positioned above the internal riser for separating a hydroprocessed product from a catalyst. The catalyst collector can be coupled to the vessel, and a regenerator may communicate with the catalyst collector to receive the catalyst for regeneration.

The embodiments disclosed herein can provide a fluidized hydroprocessing reactor. An internal riser inside the reactor can minimize the use of expansion joints required for conventional risers extending from the inside to the outside of the reactor. Such risers subject to severe conditions within the reactor and ambient conditions outside the reactor can require expansion joints typically not suited for high pressure conditions. However, utilizing an internal riser can eliminate the differential. Moreover, a fluidized reactor can allow the reduction of the catalyst size to less than about 100 microns, even less than about 50 microns, to improve diffusion of the oil into the catalyst, and hence, increased activity. Such increased activity can result in minimizing catalyst loading and possibly reducing pressure as compared to a fixed bed hydrotreating reactor. Additionally, less conventional hydrocracking feeds can be processed, such as crude oil or even crushed solid hydrocarbons, such as coal. Thus, the embodiments disclosed herein can allow the advantageous use of smaller catalyst size as a fluid catalytic cracking reactor, but allow the use of hydrogen and higher pressure as compared to an FCC reactor to obtain a desired hydroprocessed product.

DEFINITIONS

As used herein, the term "stream" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "rich" can mean an amount of at least generally about 50%, and preferably about 70%, by mole, of a compound or class of compounds in a stream.

As used herein, the term "substantially" can mean an amount of at least generally about 80%, preferably about 90%, and optimally about 99%, by mole, of a compound or class of compounds in a stream.

As used herein, the term "substantially free" can mean an amount of no more than generally about 10%, and preferably about 1%, by mole, of a compound or class of compounds in a stream.

As used herein, the term "hydroprocessing" can include hydrotreating and/or hydrocracking.

As used herein, the term "feed" can include at least one of a hydrocarbon and hydrogen.

As depicted, process flow lines in the figures can be referred to interchangeably as, e.g., lines, pipes, feeds, products, or streams.

BRIEF DESCRIPTION OF THE DRAWING

FIG. 1 is a schematic depiction of an exemplary apparatus.

DETAILED DESCRIPTION

Referring to FIG. 1, an exemplary apparatus 100 can receive a feed 80 and a stream 90 including hydrogen. The hydrocarbon feed 80 can include at least one of a distilled feed; a vacuum gas oil; a deasphalted oil; a coal-derived liquid, an asphaltenic material; a biological material, such as a cellulosic material including wood chips and/or corn stalks, or a vegetable oil; a raw crude oil; a tar sand; an oil shale; a heavy vacuum bottom; a vacuum residue; a fluid catalytic cracking short oil; other heavy hydrocarbon-derived oils; and even pulverized coal. If coal particles are utilized, desirably the coal particles are entrained in a stream of hydrogen and catalyst. Preferably, the hydrocarbon feed 80 can include a vacuum gas oil, a deasphalted oil, an asphaltenic material, a heavy vacuum bottom, a vacuum residue, or a fluid catalytic cracking short oil. Depending on the hydrocarbon feed 80, the conditions in the apparatus 100 can be adjusted. Typically, the hydrocarbon feed 80 includes at least about 10%, by weight, of the feed boiling above about 500° C. at about 100 kPa. Generally, the stream 90 can include any suitable amount of hydrogen, such as at least about 30%, about 50%, or even about 80%, by volume, hydrogen with the remaining gas in the stream 90 optionally being an inert gas, such as nitrogen.

The apparatus 100 can include a vessel 200, a regenerator 300, and optionally a lock hopper 320. The vessel 200, in turn, can include a shell 202, a base 204, a top 208, a distributor 214, an internal riser 220, a shield 236, one or more separation devices 240, a hydrogen gas distributer 254, a plurality of pans 260, and a catalyst collector 280. In some embodiments, the vessel 200 can include, e.g., the internal riser 220 and the catalyst collector 280, and in other embodiments these parts can be considered separate elements.

The internal riser 220 can be fastened to the shell 202 of the vessel 200 using any suitable means, such as beams or supports that can be welded onto the shell 202 to position the internal riser 220 within the vessel 200. Alternatively, the internal riser 220 can be supported from the base 204 of the vessel 200. Generally, the internal riser 220 can be wholly contained within the vessel 200, typically the shell 202, which may be pressurized. Optionally, at least about 90%, preferably about 99%, of a length of the internal riser 220 can be contained by the shell 202.

Desirably, the utilization of the internal riser 220 can minimize differential expansion. Particularly, having the internal riser 220 inside the vessel 200 prevents the severe conditions inside the vessel 200 from creating a large temperature and pressure differential with portions extending outside the vessel 200, as would be the case for an external riser. As a consequence, the internal riser 220 may avoid the use of expansion joints not suitable for the relatively high pressures within the vessel 200. Although the internal riser 220 can be substantially cylindrical in shape, in other embodiments, the internal riser 220 may take other shapes such as a cylinder terminating in a flared top optionally including a second cylindrical portion having a larger diameter than the bottom portion.

The shell 202 and the internal riser 220 can form an annulus 230, which can facilitate the circulation of catalysts within the vessel 200, as hereinafter described. The annulus 230 can be formed substantially symmetrically with respect to the vessel 200. Alternatively, the internal riser 220 can be offset within the vessel 200. In addition, a plurality of pans 260, namely a first pan 262, a second pan 264, a third pan 266, a fourth pan 268, a fifth pan 270, a sixth pan 272, and a seventh pan 274 may be welded to either the shell 202 or the internal riser 220. Generally, each pan of the plurality 260 can have a substantial disk-shape with an opening in the middle. Either the pan can be coupled to the internal riser 220 at the opening, e.g., the second pan 264, or fastened at its outer edge to the shell 202, e.g., the third pan 266.

A hydrogen gas distributer 254 can form a ring and surround the internal riser 220. The hydrogen gas distributer 254 may receive a fluidizing stream 250 rich in or substantially hydrogen and preferably substantially free of hydrogen sulfide. Alternatively, the fluidizing stream 250 can be rich in or substantially steam or an inert gas, such as nitrogen. Generally, the hydrogen gas distributer 254 may release hydrogen to flow counter-currently to the catalyst falling in the annulus 230.

The distributor 214 can be positioned beneath the internal riser 220 proximate to the base 204 to provide a dispersed spray of hydrocarbon and hydrogen into a stream of flowing catalyst. The design of the spray nozzle can be modified depending on the dimensions of the vessel 200. Alternatively, the hydrogen and hydrocarbon can be introduced together using any suitable device, such as a plug-valve inlet.

The shield 236, or other device, can be positioned within the vessel 200 above the internal riser 220 to prevent catalyst in the internal riser 220 from passing upward and catalyst from the one or more separation devices from passing downward there-through. In addition, one or more separation devices 240, such as one or more cyclone separators, namely a first cyclone separator 244 and a second cyclone separator 248, can be provided to separate a hydroprocessed product from the catalyst. Exemplary cyclone separators are disclosed in, e.g., U.S. Pat. No. 7,247,233.

The catalyst collector 280 can also include a plurality of plates 290, namely, a first plate 292, a second plate 294, and a third plate 296. Each plate 292, 294, and 296 can be substantially crescent-shaped and offset within the catalyst collector 280 to create a serpentine path for separating catalyst. Optionally, the catalyst can be stripped with a stream 288 containing steam. In addition to steam, other light hydrocarbon gases can be used to strip the catalyst prior to regeneration. Alternatively, the stripping of catalyst can be conducted in the regenerator 300. A valve 284, such as a double-block-and-bleed valve, can segregate the spent catalyst in the catalyst collector 280 from the regenerator 300. Thus, the catalyst can be communicated from the base 204 of the vessel 200 to the regenerator 300.

The regenerator 300 can receive a stream containing oxygen 302, such as air, provided to a burner 304 during oxidizing of the catalyst. In addition, a circulation line 306 can circulate spent gasses to the top of the regenerator 300. Typically, a cooling water exchanger 310 and a circulating compressor 312 can be provided to cool and then compress gases before returning to the regenerator 300. A pressure control valve 314 may be provided to release a relief stream 316 to control the pressure in the regenerator 300. Furthermore, a first regenerator cyclone 340 and a second regenerator cyclone 342 can be located near the top of the regenerator 300 and separate catalyst from gases. A spent catalyst line 350 can allow removal of catalyst from the regenerator 300.

The regenerator 300 can operate in any suitable mode, such as a batch operation. Particularly, the catalyst in the regenerator 300 can be purged, stripped, oxidized, purged, reduced, and sulfided prior to being transferred to the lock hopper 320. As such, other streams can be provided, individually or in any combination, by a manifold 318 to the regenerator 300, such as streams 330, 332, 334, 336, and 338 rich in or substantially containing, respectively, hydrogen, air, nitrogen, steam, and hydrogen sulfide. Desirably, the catalyst is regenerated in the presence of oxygen. The regenerator 300 can operate at any suitable pressure, such as a pressure of about 100-about 6,900 kPa, and a temperature of about 450-about 550° C. Although a batch regeneration has been discussed, it should be understood that catalyst regeneration can occur continuously. In a continuous operation, the valve 284 can be omitted. Moreover, in one exemplary embodiment, carbon coke partially oxidized or gasified from the catalyst can produce hydrogen, which can be captured and optionally provided to the vessel 200. A catalyst line 308 can transfer regenerated catalyst through a valve 362, such as a double-block-and-bleed valve, to the lock hopper 320.

The lock hopper 320 can be any suitable device that provides a nitrogen blanket to prevent the atmosphere of the regenerator 300 from interacting with the atmosphere of the vessel 200. In some exemplary embodiments, the lock hopper 320 can be optional, or be combined with the regenerator 300 as a single device. The lock hopper 320 can receive a make-up catalyst passing through a valve 364, such as a double-block-and-bleed valve, in a line 352. Generally, the catalyst is provided to the lock hopper 320 and after passing through a series of internal valves, the catalyst can be blanketed in a nitrogen environment and passed through a valve 324 before entering the vessel 200. Typically, the catalyst will pass through the valve 324, such as a double-block-and-bleed valve, that can segregate and may open to permit catalyst to enter the vessel 200 via a dip leg 328. An exemplary lock hopper is disclosed in, e.g., U.S. Pat. No. 4,872,969. Thus, regenerated catalyst can be communicated above the internal riser 220.

In operation, the apparatus 100 can receive the hydrocarbon feed 80 and the hydrogen stream 90 that may be combined in a line 94 inside the catalyst collector 280. Afterwards, the combined streams 80 and 90 may be provided to the distributor 214 within the vessel 200. Typically, the catalyst can be circulating within the vessel 200, rising in the internal riser 220 and mixing with the hydrogen and hydrocarbons. The hydroprocessing reactions can occur within the internal riser 220. Generally, the one or more products can then rise within the vessel 200 near the top 208 where the first cyclone separator 244 and the second cyclone separator 248 can separate the catalyst from the hydroprocessed product. The hydroprocessed product can exit the vessel 200 as a product stream 210 and be sent for further processing, e.g., downstream fractionation with hydrogen and heavier fractions optionally recycled. The catalyst then drops down the annulus 230 to the base 204 of the vessel 200. Some hydrogen, such as from the hydrogen gas distributer 254, and hydrocarbon can rise in the annulus 230, and be in a counter-current relation to falling catalyst. Hence, additional reactions may occur in the annulus 230. The counter-current upward flow of hydrogen in the annulus 230 can act as a catalyst regenerator and can also strip cracked products absorbed on the catalyst before reentering the riser and cracking again. Falling catalyst can either continue to circulate by rising in the internal riser 220, or fall to the catalyst collector 280 for regeneration, as described above. Desirably, a high catalyst circulation rate can remove the heat of reaction.

Generally, the vessel 200 can be operated at any suitable temperature and pressure, such as a temperature of about 250-about 650° C., preferably about 250-about 500° C., and a pressure of about 1,300-about 140,000 kPa, preferably about 3,000-about 35,000 kPa, and optimally about 3,500-about 14,000 kPa. Usually, the catalyst is provided in a ratio of about 1:1-about 100:1, preferably about 1:1-about 20:1, by weight, of catalyst to the feed 90. Any suitable liquid hourly space velocity, such as about 0.1-about 10 $hr^{-1}$, preferably about 0.5-about 3 $hr^{-1}$, may be utilized. Typically, it is preferred that the catalyst is free of any sulfide containing gases, such as hydrogen sulfide or other contaminants. A ratio of hydrogen to hydrocarbon feed can be about 80-about 3,600 $m^3/m^3$, preferably about 170-about 1,800 $m^3/m^3$.

Any suitable hydroprocessing catalyst can be utilized. The catalyst may be an inorganic oxide material, which can include porous or non-porous catalyst materials of at least one of a silica, an alumina, a titania, a zirconia, a carbon, a silicon carbide, a silica-alumina, an oil sand, a diatomaceous earth, a shale, a clay, a magnesium, an activated carbon, fused-carbon from heavy oil or coal, and a molecular sieve. A silica alumina may be amorphous or crystalline and include silicon oxide structural units. Optionally, the catalyst can include a metal deposited on the inorganic oxide material. A suitable metal deposited on the support may include at least one metal from a group 6 and groups 8-10 of the periodic table. The catalyst may include one or more metals of chromium, molybdenum, zirconium, zinc, tungsten, iron, ruthenium, osmium, cobalt, rhodium, iridium, nickel, palladium, and platinum, and preferably may include platinum or palladium. The metal component of the group 6 can be in an amount of about 1-about 20%, by weight; the iron-group metal component of groups 8-10 may be in an amount of about 0.2-about 10%, by weight; and the noble metal of groups 8-10 can be in an amount of about 0.1-about 5%, by weight, based on the total weight of the catalyst. It is further contemplated that the catalyst may also include at least one of cesium, francium, lithium, potassium, rubidium, sodium, copper, gold, silver, cadmium, mercury and zinc. The catalyst may be formed into spheres and spray-dried.

Alternatively, the catalyst includes two components or catalysts, namely a first component or catalyst such as an active amorphous clay and/or a high activity crystalline molecular sieve, and a second component or catalyst such as a medium or smaller pore zeolite. Such a catalyst mixture is disclosed in, e.g., U.S. Pat. No. 7,312,370 B2. Still yet another embodiment can be a slurry catalyst composition, which may include a catalytically effective amount of one or more compounds having iron. Particularly, the one or more compounds can include at least one of an iron oxide, an iron sulfate, and an iron carbonate. Other forms of iron can include at least one of an iron sulfide, a pyrrhotite, and a pyrite. What is more, the catalyst can contain materials other than an iron, such as at least one of molybdenum, nickel, and manganese, and/or a salt, an oxide, and/or a mineral thereof.

Typically, about 0.1-about 1%, by weight, of the circulating catalyst can drop through the catalyst collector 280, pass through the plurality of plates 290, and optionally be stripped by steam via the stream 288. After sufficient volume accumulates within the catalyst collector 280, the valve 284 can be opened to allow regeneration of the catalyst in the regenerator 300. Typically, the regeneration takes place in an oxygen environment and other processes can occur such as purging, stripping, reducing, and sulfiding, as described above. Afterwards, the regenerated catalyst can optionally be provided to the lock hopper 320 and provided at the top 208 of the vessel 200.

Generally, the catalyst or at least a portion can be no more than about 1,000 microns, preferably may be no more than about 500 microns, even preferably no more than about 100 microns, and optimally no more than about 50 microns, in diameter, to facilitate reactions and increase the overall surface area of the catalyst. In one exemplary, the catalyst may have an average diameter of about 50-about 100 microns.

Typically, the additional surface area can be about 30 times greater than the surface area utilized in standard hydrocracking fixed beds. As such, contacted catalyst surface area can be about 300-about 600 times greater. Hence, the catalytic activity can be increased, and thus, potentially, the pressure within the vessel 200 may be lowered further. Alternatively, the charge to the vessel 200 can be increased, or significantly more difficult feeds can be processed, such as crude oil or even solid fuels, such as coal.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An apparatus for receiving a hydrocarbon feed for hydroprocessing, comprising:
    A) a vessel, in turn, comprising:
        1) an internal riser wholly contained within a shell of the vessel;
        2) one or more separation devices positioned above the internal riser for separating a hydroprocessed product from a catalyst; and
        3) a distributor or a plug-valve inlet positioned underneath the internal riser for introducing both hydrogen provided by a line and the hydrocarbon feed provided by another line; and
    B) a regenerator located below said internal riser, so catalyst can fall from the vessel into the regenerator for regeneration.

2. The apparatus according to claim 1, wherein said regenerator communicates with a base of the vessel for receiving catalyst.

3. The apparatus according to claim 2, wherein the regenerator communicates regenerated catalyst above the internal riser.

4. The apparatus according to claim 1, wherein the one or more separation devices comprises one or more cyclone separators.

5. The apparatus according to claim 1, wherein the vessel further comprises a hydrogen gas distributer forming a ring surrounding the internal riser and positioned within the shell.

6. An apparatus for receiving a hydrocarbon feed for hydroprocessing, comprising:
    A) a vessel;
        1) an internal riser wholly positioned within the vessel;
        2) one or more separation devices positioned above the internal riser for separating a hydroprocessed product from a catalyst; and
        3) a distributor or a plug-valve inlet positioned underneath the internal riser for introducing both hydrogen provided by a line and the hydrocarbon feed provided by another line;
    B) a catalyst collector coupled to the vessel; and
    C) a regenerator communicating with the catalyst collector to receive the catalyst for regeneration; wherein the regenerator communicates with a base of the vessel for receiving catalyst; and wherein the vessel, the catalyst collector and the regenerator form a single unitary apparatus.

7. The apparatus according to claim 6, wherein the regenerator communicates regenerated catalyst above the internal riser.

8. The apparatus according to claim 6, wherein the one or more separation devices comprises one or more cyclone separators.

9. The apparatus according to claim 6, wherein the vessel further comprises a shell and the shell and internal riser form an annulus facilitating catalyst circulation within the vessel.

10. The apparatus according to claim 9, wherein the vessel further comprises a hydrogen gas distributer forming a ring surrounding the internal riser and positioned in the annulus.

11. The apparatus according to claim 9, wherein the vessel further comprises a plurality of pans coupled to the internal riser or fastened to the shell.

12. The apparatus according to claim 11, wherein each pan of the plurality of pans has a substantial disk-shape.

13. The apparatus according to claim 6, wherein the catalyst collector comprises a plurality of plates.

14. The apparatus according to claim 13, wherein each plate of the plurality of plates is substantially crescent-shaped and offset within the collector to create a serpentine path for separating catalyst.

15. The apparatus according to claim 6, wherein the vessel further comprises a shield positioned within the vessel and above the internal riser to prevent catalyst from the internal riser passing upward past the shield.

16. The apparatus according to claim 6, further comprising a lock hopper for receiving regenerated catalyst, blanketing the regenerated catalyst in a nitrogen environment, and passing the regenerated catalyst to the vessel.

* * * * *